Oct. 23, 1951     O. H. KILGORE     2,572,353

WATER BAG HOLDER

Filed Oct. 2, 1950

INVENTOR.
Otis H. Kilgore
BY
Stedman B Hoar
Agent

Patented Oct. 23, 1951

2,572,353

UNITED STATES PATENT OFFICE 2,572,353

WATER BAG HOLDER

Otis H. Kilgore, Santa Ana, Calif.

Application October 2, 1950, Serial No. 187,970

3 Claims. (Cl. 224—42.45)

This invention relates to a holding device for securing a water bag to the exterior of a vehicle.

Persons travelling by automobile in hot weather or across arid country find it desirable and indeed often necessary to transport a supply of drinking water with them. In order to maintain the water at a cool and refreshing temperature, the water is often carried in slightly porous textile bags, which permit a gradual seepage to their exterior, resulting in cooling by evaporation. Such bags have been used for many years and are a well-known accessory for hot-weather travel.

However, with the advent of modern automobiles of stream-lined design, motorists find no suitable place or means for attaching such bags to the exterior of their automobiles. No longer is the old-fashioned running-board available, and it is not desirable to suspend a bag from a door-handle, where the wind-stream will cause the bag to rub against the door panel. It obviously invites loss of the bag to place the bag upon the forward or rear bumpers unattached to the automobile. Furthermore, such bags should be suspended from the top and not supported from below, as folding of their textile material unduly increases the rate of seepage.

It is a principal object of my invention to provide a holding device for a water bag capable of holding the bag suspended on the exterior of a modern automobile in a manner both secure and not detracting from the appearance of the vehicle.

Another object of the invention is to provide a holding device capable of attachment to practically any modern type of automobile headlight and capable of supporting thereon a container, such as a water bag, having a cord handle.

Other objects and advantages of my invention will appear as the following description of a preferred embodiment of my invention proceeds.

In broad terms my invention comprises a strap adapted to encompass the rim of an automobile headlight and having fastening means and means insertable in the lamp lens housing for holding the strap in place. Clips are disposed along the strap to receive and hold the cord of a water bag so that the bag is supported by the headlight rather than by the more fragile strap and hangs below the headlight within the area protected by the forward bumper.

In the accompanying drawing illustrative of a preferred embodiment of my invention, Fig. 1 is a perspective view showing a water bag suspended on an automobile headlight by my holding device;

Figure 1:
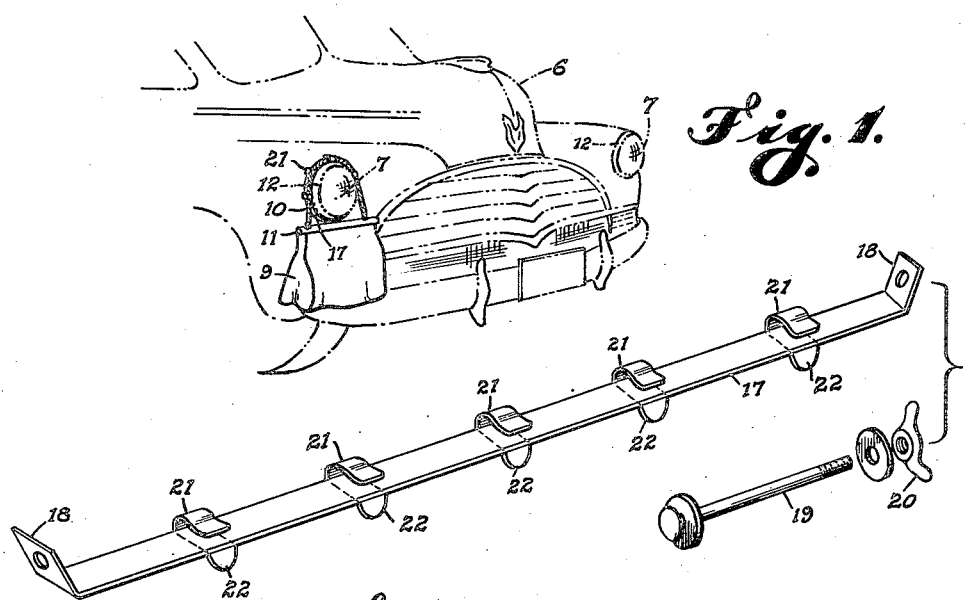
Figure 2:
Fig. 2 is an exploded view, in perspective, of my holding device.

Having reference now to the details of the drawing, I have shown in Fig. 1 an automobile 6 having headlights 7 and front bumper 8. A conventional water bag 9 is supported by its cord 10 upon one of the headlights 7 in the manner hereinafter described. It may be noted that most water bags have a bar 11 across their upper ends to hold the bag laterally distended so that the textile of the bag does not fold and become unduly porous, and that the cord handle 10 is attached to the ends of this bar. The conventional headlight also has a molding rim 12 which fairs the headlight into the automobile fender 14, and the juncture of the rim 12 and fender 14 provides a narrow peripheral slot 15.

Figure 4:
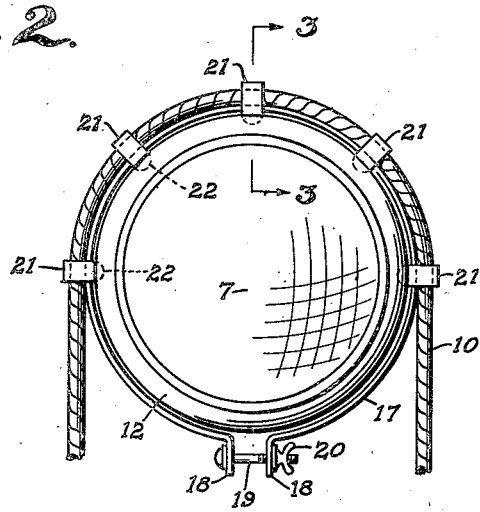
Fig. 4 is a frontal elevational view showing the device clamped on a headlight.
Figure 3:
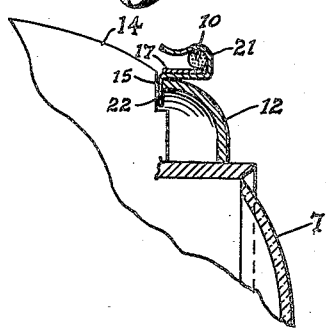
Fig. 3 is a vertical sectional view taken on the plane of section 3—3 of Fig. 4, showing how the strap of my device is held upon a headlight rim.

A strap 17, preferably of metal, is cut to a length sufficient to substantially encompass the molding rim 12, and has its ends 18 bent and pierced to hold a bolt 19 as shown in Fig. 4. The bolt 19 may suitably have a wing nut 20 by which the strap 17 may be tensioned upon the rim. It will be understood that any suitable buckle or like device may be substituted for the bolt 19 to join the ends of the strap 17 below the headlight. A plurality of clips 21 are secured, as by spot welding, at spaced intervals along that part of the strap 17 which overlies the upper half of the headlight, these clips being preferably of spring metal and being placed transversely of the strap so as to receive and hold a cord parallel to the strap and to open rearwardly. The portion of each clip 21 in contact with the strap 17 extends to the edge of the strap and there is bent to form a thin prong or spur 22 extending outwardly from and perpendicularly to the face of the strap opposite the jaw or clip portions of the clips 21. The prongs 22 are sufficiently thin to be capable of being inserted in the slot 15 between the headlight molding rim and the fender.

The manner of installing and using my water bag holder will be obvious. The strap 17 is placed around the molding rim 12 and drawn tight by the bolt 19. So tightening the strap causes the prongs 22 to enter the slot 15 to hold the strap so that it can not slide off the rim 12. The cord 10 is then inserted in the clips 21, and the bag 9 is thus suspended from the headlight.

Even if the cord becomes dislodged from the clips 21, it can not depart from the headlight except by jumping the clips. The bag 9 does not screen the headlight but hangs below the lens and in general behind or just below the end of the front bumper, depending upon the curvature of the bumper. As it does not project beyond the outlines of the automobile it becomes hardly noticeable and does not detract from the appearance of the automobile or obstruct air-flow. The strap 17 need not be metallic, but it is preferably made of metal in order that it may be plated to conform in appearance to the customary chromium trim.

While I have described and illustrated a preferred embodiment of my invention, it is to be understood that such description and illustration is not to be taken in a limiting sense and that modifications coming within the scope of the appended claims are to be considered as embodiments of the spirit of my invention.

I claim:

1. In a device for attaching a container having a cord handle to a vehicle headlight, said headlight having a molding rim forming with body portions of said automobile a peripheral slot: a strap adapted to overlay said rim; clips on said strap for engaging said cord handle; prongs on said strap adapted to penetrate said slot; and means for tightening said strap upon said rim.

2. In a device for attaching a container having a cord handle to a vehicle headlight, said headlight having a molding rim forming with body portions of said automobile a peripheral slot: a flexible strap adapted to overlay said rim so as to substantially encompass said rim; means for tightening said strap upon said rim; a plurality of prongs on said strap inwardly radial thereto when said strap is bent to encompass said rim for then penetrating said slot; and spring clips on the outer side of said strap adapted to receive said cord handle from a rearward direction.

3. In a device for attaching a container having a cord handle to a vehicle headlight, said headlight having a molding rim forming with body portions of said automobile a peripheral slot: a metallic strap adapted to overlay said rim so as substantially to encompass said rim; means for tightening said strap upon said rim; and a plurality of metallic clips secured to said strap on the outer side of said strap and adapted to receive and hold said cord handle, said clips having prongs extending radially inwardly from said strap to penetrate said slot.

OTIS H. KILGORE.

No references cited.